ically directly opposite one another. This provides the most satisfactory results, but it is desirable to have the machines in staggered positions, as for example to effect even distribution of the load on the floor, the belts 11 and 12 may be of different lengths.

United States Patent
Horn

[15] 3,655,024
[45] Apr. 11, 1972

[54] METHOD OF AND APPARATUS FOR FEEDING WORKPIECES TO TWO MACHINE UNITS

[72] Inventor: Arthur H. Horn, Waukesha, Wis.

[73] Assignee: Chas. H. Stehling Company, Milwaukee, Wis.

[22] Filed: May 22, 1970

[21] Appl. No.: 39,810

[52] U.S. Cl. .......................198/20 T, 198/31 AC, 198/101
[51] Int. Cl. .....................................B65g 37/00, B65g 47/26
[58] Field of Search .................198/20 T, 31 AC, 76, 101, 78

[56] References Cited

UNITED STATES PATENTS 1,959,662    5/1934    Ellis...........................................198/20 T

*Primary Examiner*—Edward A. Sroka
*Attorney*—Ira Milton Jones

[57] ABSTRACT

A belt-type conveyor apparatus for feeding workpieces to two separate machine units arranged in tandem and operating at the same speed, by which workpieces loaded onto the receiving end of the conveyor apparatus at a rate twice the operating speed of the machine units, are fed to the machine units at a rate that matches the speed of the machine units.

9 Claims, 1 Drawing Figure

PATENTED APR 11 1972  3,655,024
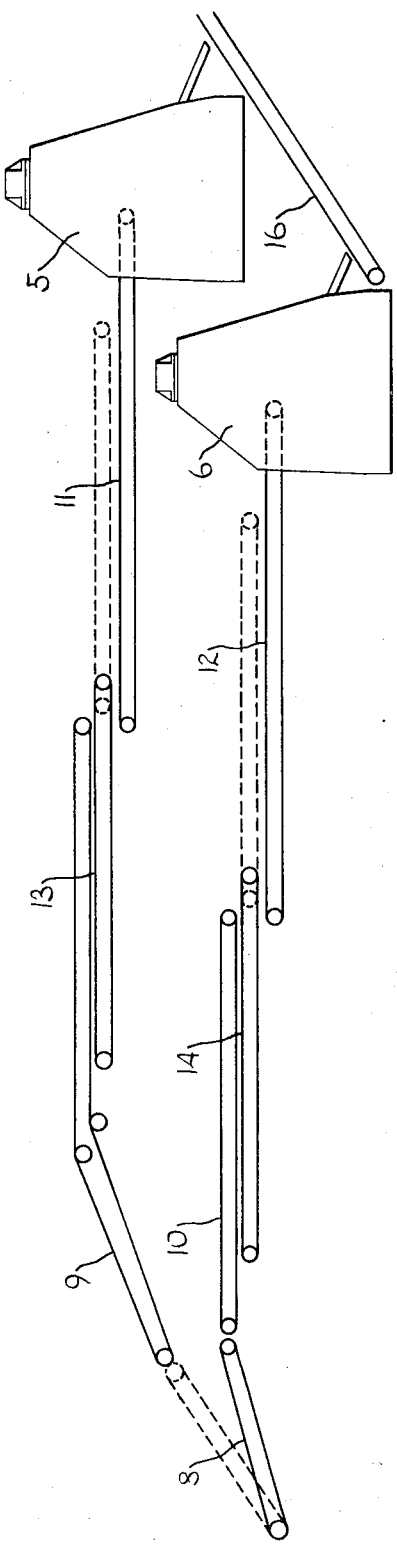
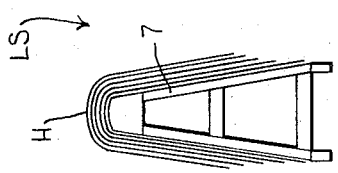
INVENTOR
Arthur H. Horn
BY
ATTORNEY

METHOD OF AND APPARATUS FOR FEEDING WORKPIECES TO TWO MACHINE UNITS

This invention relates broadly to conveyor systems and apparatus, and refers more particularly to work feeding conveyors by which workpieces are fed to machines.

The primary purpose and object of the invention is to enable a single operator to feed workpieces to two machine units (both of which perform the same operation or operations upon the workpieces and operate at the same speed) and maintain an output of work no lower than the combined output of two operators, one for each machine unit.

More specifically, it is the purpose and object of this invention to provide a method and apparatus for practicing the same, whereby workpieces loaded onto a receiving conveyor at a single loading station, are conveyed alternately first to one and then the other of two tandem arranged machine units, with the workpieces travelling towards the machine units at twice the operating speed of the machine units for a substantial part of the distance, and entering the machine units at the operating speed thereof, without in anywise interfering with smooth continuous advance of the workpieces to the machine units.

With these observations and objectives in mind, the manner in which the invention achieves its purpose will be appreciated from the following description and the accompanying drawing, which exemplify the invention, it being understood that such changes in the precise method of practicing the invention and in the specific apparatus disclosed herein may be made as come within the scope of the appended claims.

The accompanying drawing illustrates one complete example of the embodiment of the invention constructed according to the best mode so far devised for the practical application of the principles thereof, and in which:

The single FIGURE more or less diagrammatically illustrates the conveyor apparatus of this invention.

Referring to the drawing, the numerals 5 and 6 designate two similar machine units, arranged in tandem and by which the same operation or operations may be performed upon workpieces fed thereto. For purposes of illustration, the machine units depicted are hide working machines, such as, for example, the wringer of U.S. Pat. No. 2,586,879. Both machines have the same operating speed. Hence the workpieces — hides or leather — must be fed into the two machines at the same rate, which of course must match the operating speed of the machines. While this can be done by two operators, one for each machine — as has been the practice in the past — a single operator could easily keep two machines operating at maximum output if the feeding operation could be performed at one spot or loading station. The present invention makes this possible.

Hence, in accordance with this invention, workpieces brought to a loading station LS — as, for instance, hides H draped over a portable horse 7 — are successively deposited onto a travelling belt-type receiving conveyor 8. This receiving conveyor is arranged to swing between a raised position (shown in dotted lines) and a lowered position (shown in full lines). In the first of these positions, the discharge end of the conveyor 8 is in juxtaposition to the receiving end of an upper belt-type conveyor 9, which for convenience in distinguishing one conveyor from another, will be referred to as a transport conveyor. In its lowered position, the receiving conveyor 8 has its discharge end positioned to deliver workpieces to a second, lower belt-type transport conveyor 10.

The transport conveyors carry the workpieces towards, but do not deliver them directly to belt-type feeding conveyors 11-12. The feeding conveyors operate on levels below those of their respective transport conveyors and have their discharge ends positioned to feed workpieces directly into the machine units.

To properly present the workpieces to the machine units, the feeding conveyors 11 and 12, of course, must advance the workpieces at a rate of travel that matches the operating speed of the machine units, or — in other words — the conveyor speed of the feeding conveyors should be the same as the operating speed of the machine units. On the other hand, if the maximum output of the two machine units is to be had, the workpieces must be loaded onto the receiving conveyor 8 at a rate twice that at which either feeding conveyor presents them to a machine unit. By the same token, the receiving conveyor 8 and the transport conveyors must travel at twice the speed of the feeding conveyors. This then entails a transition in the rate of advance of the workpieces from high speed travel to low speed travel which must be accomplished without disturbing the workpieces in transit.

To effect the needed transition in the rate of advance of the workpieces, bodily translatable belt-type conveyors 13-14 transfer the workpieces from the fast moving transport conveyors to the slower moving feeding conveyors. These translatory conveyors are mounted on tracks (not shown) for bodily translation along horizontal paths between retracted positions shown in full lines and advanced positions shown in dotted lines.

In their retracted positions the translatory conveyors are under their respective transport conveyors with their discharge ends a short distance downstream of the discharge ends of the transport conveyors; and in their advanced positions the translatory conveyors are above their respective feeding conveyors.

The belt speed of the translatory conveyors is the same as that of the feeding conveyors, so that upon cessation of bodily advance of the translatory conveyors in their advanced positions, workpieces thereon will be conveyed towards and onto the feeding conveyors without change in their rate of travel.

Bodily traverse of the translatory conveyors, at least in the forward direction, takes place at one-half the conveyor speed of the transport conveyors, so that the net rate of advance of the belts of the translatory conveyors during forward translation thereof, is the same as the conveyor speed of the transport conveyors. A workpiece leaving the discharge end of a transport conveyor is thus laid smoothly and without disruption onto the translatory conveyor therebelow, to continue its advance towards the machine unit to which it is being fed at the fast rate until it has completely left the transport conveyor and is supported only by the translatory conveyor. At that point, the bodily advance or forward translation of the translatory conveyor stops, and the moving belt or belts of the translatory conveyors alone advance the workpiece towards and onto the feeding conveyor therebeneath, so that the workpiece continues its advance at the slow rate which matches the operating speed of the machine units.

As soon as transfer of a workpiece from a translatory conveyor to the feeding conveyor therebeneath has taken place and the translatory conveyor is "empty," it is retracted so as to be in position to receive the next workpiece being fed by its respective transport conveyor.

The processed workpieces discharged from the machine units are deposited upon a delivery conveyor 16 which extends from the first machine unit 6 past the second unit 5, and which travels at twice the operating speed of the machine units.

As will be understood, the various conveyors are suitably supported by structure, not shown for sake of clarity and simplicity in the disclosure, and are driven by appropriate drive means (also not shown). The mechanism by which the receiving conveyor 8 is shifted from one to the other of its two positions, and the translatory conveyors are moved back and forth, has also been omitted from the drawing as not necessary to an understanding of the invention.

Those skilled in the art will appreciate that the invention can be embodied in forms other than as herein disclosed for purposes of illustration.

The invention is defined by the following claims:

1. The method of feeding workpieces to two machine units operating at substantially the same speed, which method comprises:

A. placing the workpieces alternately on and advancing them by first one and then the other of two transport conveyors, each of which has a conveyor speed that is substantially twice the operating speed of the machine units;

B. discharging the workpieces from the transport conveyors onto translatory conveyors that have a conveyor speed substantially less than that of the transport conveyors but which are also bodily advanced;

C. so relating the conveyor speed of the translatory conveyors and the bodily advance thereof that together they advance of the workpieces at the speed the transport conveyors advance them;

D. when a workpiece is fully transferred from a transport conveyor onto its respective translatory conveyor, stopping the bodily advance of the latter; and E. discharging the workpieces from the translatory conveyors onto feeding conveyors which have a conveyor speed that matches the operating speed of the machine units and feed the workpieces into the machine units.

2. The method of claim 1, further characterized by:
discharging the workpieces from both machine units onto a common delivery conveyor that has a conveyor speed substantially twice that of the machine units.

3. The method of claim 1, further characterized by:
retracting the translatory conveyors from their advanced positions to retracted positions in time to receive the next workpieces being advanced by and discharged from the transport conveyors.

4. Apparatus for feeding workpieces from a source thereof to two machine units operating at substantially the same speed, comprising:

A. first and second transport conveyors, one for each machine unit, to convey workpieces from the source thereof towards the respective machine units;

B. translatory conveyors cooperatively associated with said transport conveyors to receive workpieces therefrom and convey the same along separate defined paths towards the machine units;
said translatory conveyors being bodily translatable along said separate defined paths between retracted positions in which they can receive workpieces from their respective transport conveyors and advanced positions, and said translatory conveyors having a conveying function independent of their bodily translation; and C. feeding conveyors associated with the translatory conveyors to receive workpieces therefrom and feed such workpieces directly to the machine unit; the feeding conveyors having a conveyor speed that matches the speed of the machine units, the transport conveyors having a conveyor speed substantially twice that of the machine units, and the translatory conveyors having a conveyor speed that is less than that of the transport conveyors, but which, when added to forward translation of the translatory conveyors advances the workpieces at a rate that matches the conveyor speed of the transport conveyors, so that smooth transfer of workpieces from the transport conveyors to the translatory conveyors is assured.

5. The apparatus of claim 4, wherein all of said conveyors are of the belt type.

6. The apparatus of claim 4, further characterized by:
a receiving conveyor onto which the workpieces are placed at the source thereof, said receiving conveyor having a discharge end selectively positionable in juxtaposition to the receiving end of either of said transport conveyors to feed workpieces thereto,
whereby the receiving conveyor may feed workpieces alternately to said two transport conveyors.

7. The apparatus of claim 7, wherein said receiving conveyor has a conveyor speed that matches that of the transport conveyors.

8. The apparatus of claim 4, further characterized by
a common delivery conveyor to receive workpieces from both of said machine units,
said delivery conveyor having a conveyor speed substantially twice the speed of the machine units.

9. In combination:

A. two machine units arranged in tandem and operating at the same speed to perform the same operation upon workpieces fed thereto;

B. a belt type feeding conveyor for each machine unit to feed workpieces thereto,
said feeding conveyors having a conveyor speed that matches the operating speed of the machine units;

C. two belt type transport conveyors, one for each machine unit to advance workpieces towards the machine units;

D. a belt type receiving conveyor cooperatively associated with the transport conveyors to feed workpieces placed thereon alternately to first one and then the other of said transport conveyors,
the receiving conveyor and the two transport conveyors having a conveyor speed twice that of the feeding conveyors; and E. transfer means operatively associated with the transport conveyors and the feeding conveyors to receive workpieces from the transport conveyors at the rate they are advanced by the latter and transfer the same to the feeding conveyors at the rate the feeding conveyors carry them to the machine units, said transfer means comprising belt-type conveyors that are translatable lengthwise of the conveying stretch of their belts forward to an advanced position over their respective feeding conveyors and rearward to a retracted position under their respective transport conveyors,
the belt speed of said translatable conveyors and the rate of their forward translation being the same as the conveyor speed of the feeding conveyors, so that the net rate of the advance of the workpieces by said translatable conveyors during forward translation thereof equals that produced by the transport conveyors, and the rate of the advance of the workpieces by said translatable conveyors upon cessation of forward translation thereof equals that produced by the feeding conveyors.

* * * * *